United States Patent
Mentchoukov (10) Patent No.: US 7,313,590 B2
(45) Date of Patent: Dec. 25, 2007

(54) METHOD AND SYSTEM FOR FILE SERVER DIRECT CONNECTION

(75) Inventor: Nikolai Mentchoukov, Scottsdale, AZ (US)

(73) Assignee: Rich Media Club, LLC, Miami Beach, FL (US)

( * ) Notice: Subject to any disclaimer, the term of this patent is extended or adjusted under 35 U.S.C. 154(b) by 791 days.

(21) Appl. No.: 10/316,431

(22) Filed: Dec. 11, 2002

(65) Prior Publication Data

US 2003/0120727 A1    Jun. 26, 2003

Related U.S. Application Data

(60) Provisional application No. 60/340,692, filed on Dec. 12, 2001.

(51) Int. Cl.
G06F 15/16 (2006.01)

(52) U.S. Cl. .............. 709/203; 709/219; 709/227; 715/513; 707/100

(58) Field of Classification Search ............... 709/226, 709/229, 245, 203, 219, 227, 248; 707/104.1; 713/200; 715/513; 719/315
See application file for complete search history.

(56) References Cited

U.S. PATENT DOCUMENTS

| | | | |
|---|---|---|---|
| 5,706,507 A * | 1/1998 | Schloss ................. | 707/104.1 |
| 6,233,618 B1 * | 5/2001 | Shannon ................. | 709/229 |
| 6,516,337 B1 * | 2/2003 | Tripp et al. ............. | 709/202 |
| 6,591,305 B2 * | 7/2003 | Densmore ............... | 709/245 |
| 6,625,581 B1 * | 9/2003 | Perkowski ............... | 705/27 |
| 6,757,900 B1 * | 6/2004 | Burd et al. .............. | 719/316 |
| 7,013,340 B1 * | 3/2006 | Burd et al. .............. | 709/229 |
| 2002/0062391 A1 * | 5/2002 | Densmore ............... | 709/245 |
| 2002/0083178 A1 * | 6/2002 | Brothers ................. | 709/226 |

* cited by examiner

Primary Examiner—Khanh Dinh
(74) Attorney, Agent, or Firm—Manuel Valcarcel, Esq.

(57) ABSTRACT

A system for directly establishing network connections between a client and server system by means of a single compiled file that does not require an additional network communications system such as a web browser or other supporting application. Specifically, by launching the compiled file itself, a network connection is established to an encoded URL, and information is delivered to the user in the form of streaming media. Differing from a typical browser, or other typical network enabling software systems, the communication link established by the compiled file is predominantly one way and non-conversational. Relying on graphical animation media, the system permits the delivery of new information and embedded code in response to a user's action. Impact on system resources is reduced as overhead support software is not required. Likewise bandwidth is conserved and issues of privacy are maintained as minimal information is exchanged without user interaction.

10 Claims, 8 Drawing Sheets

METHOD AND SYSTEM FOR FILE SERVER DIRECT CONNECTION

PRIOR U.S. APPLICATION

This Specification is based on U.S. Provisional Application Ser. No. 60/340,692 filed on Dec. 12, 2001. The inventor claims the benefit of Title 35, Section 119 of the U.S. Code based on said provisional application.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office Patent file or records, but otherwise reserves all copyright rights whatsoever.

TECHNICAL FIELD

The present invention relates generally to the transfer of information between client and server computer systems connected via networks, including, but not limited to, the global computer network commonly referred to as the Internet.

BACKGROUND OF THE INVENTION

With the growing prevalence of use and, in fact, reliance, upon the Internet for the transformation of data, dissemination of information, entertainment, recreation, and commercial activities, there is an ever-increasing need to balance a variety of issues, not the least of which include: a) privacy, b) system resources, and c) bandwidth.

While each of these issues involves a multitude of sub issues, fundamentally, they can each be understood in simplistic terms:

(a) Privacy—is the information transferred from one system to another handled in such a way that it is secure from prying eyes and/or theft and misapplication? One simple example of such privacy concerns among the public community of Internet users is that credit card information be transferred in such a form that it cannot be stolen and misappropriated.

(b) System resources—how much of the computer system must be dedicated to the desired operation? Each and every application that is opened or run on a computer, be it a client or server system, involves the use of that specific system's resources. In some situations, it is perfectly acceptable to expend a significant amount of system resources to accomplish a desired task, while at other times it may seem a waste to launch a sophisticated application that may require significant system resources simply to transfer but a few bytes of information.

(c) Bandwidth—how much connectivity is available and must be dedicated to the transfer of the information? There is a very close relationship between the amount of bandwidth available and the amount of information to be transferred.

Users of networked systems typically rely on robust applications, such as web browsers and browser technology, to handle and maintain the transfer of information between systems. In settings where the intent of the user is to truly use the browser or application, there is little question given to the issue of engaged system resources or bandwidth usage, as both are fundamental components to the primary activity engaged in by the user. In other situations, however, such as email advertisements, including embedded links to merchandisers and/or sites with information, banner ads, or simply the desire to enhance the speed of content delivery and interaction, the current practice of launching an additional browser window or dedicated application to accommodate the new media, initiate the connection, or transfer the information may be far more than the user desires.

Commonly, this methodology of using a browser or other preexisting application is employed simply because of the preexisting security measures that are incorporated into browsers, as well as the long-standing abilities of browsers to effectively negotiate communications between systems. This behavior is somewhat of a double-edged sword, for, while providing means for permitting security, browser interaction also permits the automated exchange of information that is not secure.

Security measures themselves typically involve a number of complex elements, including (1) the generation, distribution and management of public and private encryption keys, and (2) the burdens of establishing dedicated security systems and architecture for database systems used to store, provide, and manipulate the information deemed worthy of security protection.

Further, system resources are taxed by requiring the system to launch and maintain an additional application that may well exceed the necessary capabilities required for the desired communication and, in some cases, even the capabilities of the system itself. Additionally, as browsers and networked applications are continuously involved in two-way communication between the client and server systems involved in the communications, the bandwidth resources available to the communication effort are monopolized at a level, that although customary, are perhaps more than truly required.

A great need exists for a system capable of communicating information in a secure, less system-intensive or invasive means and which minimizes bandwidth usage.

The present invention fills the above-mentioned needs. Specifically, the present invention provides a system for communication over a network by means of TCP/IP by means of a self-contained file that generates a non-conversational message directed to a server for storage and/or processing. The communication is direct between said file and said server without use of a browser application.

The present invention minimizes, if not eliminates, (1) the amount of unintended information transferred from the client system to the server system, and (2) access to the client system from the server system (which may be unknowingly provided). The present invention provides the means and capability to rapidly provide interaction between the client and server systems by reducing the exchange of information to be as nearly one-way as possible, thus, conserving bandwidth resources and permitting greater speed in transfer and perceived interaction. The present invention provides the means and capability to transmit a secured message without requiring additional security system applications, protocols, or end user involvements. The present invention provides the means and capability to receive, keep, and maintain data in a secured form without requiring the distribution of encryption keys.

The present invention provides the means and capability to utilize a database server without requiring specific security integration or setup to manage encryption keys and processes from a single location without requiring direct end user interaction, and to reduce the bandwidth requirements for transfer, and thereby increase the relative speed of the communication transaction speed.

SUMMARY OF THE INVENTION

According to a preferred embodiment hereof, this invention provides a method and system for sending to at least one custom server-based application for storage or processing a non-conversational message from at least one self-contained file from at least one first computer communicating with at least one network using Internet protocol without opening the at least one first computer to the at least one network comprising the steps of: selecting at least one first file residing on the at least one first computer; creating on the at least one first computer a first data string representing contents of such at least one first file; attaching to such data string a URL indicator representing the custom server-based application; and sending from such at least one first computer such first data string and such URL indicator in such manner that such at least one network is used for transmittal of such first data string and such URL indicator to the at least one custom server-based application, and such transmittal may be made without opening the at least one first computer to the at least one network or use of a browser. It further provides such a method and system wherein such transmittal serves, at least in part, a purpose of tracking at least one action of such at least one first computer. Also, it provides such a method and system further comprising the step of encrypting such at least one first data string to form at least one encrypted data string for use in the transmittal. And it provides such a method and system further comprising the steps of: providing for such at least one custom server-based application to receive such transmittal; and providing for such at least one custom server based application, responsive to receiving such transmittal, to make at least one selected other first data string and URL indicator available to at least one second computer attached to at least one such network.

Additionally, in accordance with a preferred embodiment, this invention provides a system for sending to at least one custom server-based application for storage or processing a non-conversational message from at least one self-contained file from at least one first computer attached to at least one network using Internet protocol without opening the at least one first computer to the at least one network and without using a browser application comprising: interface means for selecting at least one first file residing on the at least one first computer; processor means for creating on the at least one first computer a first data string representing contents of such at least one first file; processor means for attaching to such data string a URL indicator representing the custom server based application; and computer communication means for sending from such at least one first computer such first data string and such URL indicator in such manner that such at least one network is used for transmittal of such first data string and such URL indicator to the at least one custom server-based application, and such transmittal may be made without opening the at least one first computer to the at least one network or using a browser application. It also provides such a system wherein such transmittal serves, at least in part, a purpose of tracking at least one action of such at least one first computer. Further, it provides such a system further comprising processor means for encrypting such at least one first data string to form at least one encrypted data string for use in the transmittal. And it provides such a system further comprising: computer communication means for providing for such at least one custom server-based application to receive such transmittal; and processor means for providing for such at least one custom server-based application, responsive to receiving such transmittal, to make at least one selected other first data string and URL indicator available to at least one second computer attached to at least one such network.

In all applications of the present invention as taught, the communication established between the networked systems (client and server) is commenced entirely from the file created and provided under the present invention.

Within the context of advertising and a user's responses to banner ads or embedded links in bulk email, traditionally, the user's request is handled through re-direction. First, a connection is established with a tracking system that records the user's response to the URL of the selected ad or link, and then, the destination IP address URL is provided. According to the teachings of the present invention, this action is split into two separate, yet simultaneous actions. When a user clicks or requests a URL from the file, as presented under the present invention, the user is taken directly to the URL of interest, while a query string is independently sent to the tracking server. The performance of the tracking server cannot affect the user's experience. Further, the use of independent connection processes insures that the user's system and privacy is not further exposed to the tracking system.

Within the context of secured transactions, the present invention provides complete security by imposing encryption during the entire process of transmission and storage, and without opening the user's system to the Internet.

Within the context of server side data sharing, the present invention provides fast and efficient, predominantly one-way communication, without opening the user's system to the Internet.

DEFINITIONS, ACRONYMS AND CROSS-REFERENCES

The following terms and acronyms, explained below as background, are used throughout the detailed description:

Client-Server. A model of interaction in a distributed system in which a program at one site sends a request to a program at another site and waits for a response. The requesting program is called the "client," and the program that responds to the request is called the "server." In the context of the World Wide Web, the client is typically a "Web browser" that runs on a user's computer; the program that responds to Web browser requests at a Web site is commonly referred to as a "Web server."

Domain Name System (DNS). An Internet service that translates domain names (which are alphabetic identifiers) into IP addresses (which are numeric identifiers for machines on a TCP/IP network).

Flash. Provided by Macromedia, Flash is the leading vector-based animation tool for the web. Flash was initially intended to create animations over the Internet by providing mathematical descriptions of how to draw the desired image, rather than providing the entire image itself. Based upon code instructions rather than component bits of images, Flash files are typically much smaller in file size then conventional image files.

Flash Player. Provided by Macromedia, this is a small application that permits a user's system to process the coded instructions of a Flash file without instantiating an application other than the received Flash file itself.

FSDC (File Server Direct Communication) Technology. A method to establish a direct connection via the Internet between a self contained file and a custom server based application for online secured transactions, statistic tracking and server based data sharing.

General Description:

All existing applications to communicate with a user via the Internet are based on the following two methods.

(1) Using the Internet browser (Netscape and Internet explorer, for example) to communicate with the server.

(2) Having the user download and install a custom application on their hard drive to communicate with the server.

In case 1) the Internet browser holds specific objects (for example, the history object of the browser itself, or a custom object supported by the browser) which can be recognized by the web server.

In case 2) the custom application installed on the user's computer is used to communicate with the server.

The present invention uses FSDC via the specific nature of the .swf file generated in Macromedia Flash software, which can send a query string directly to the server (specific URL) without requests to the history object of the Internet browser.

Internet Information Server (IIS). Microsoft Corporation's Web server that runs on Windows NT platforms.

Internet. A collection of interconnected (public and/or private) networks that are linked together by a set of standard protocols to form a distributed network. While this term is intended to refer to what is now commonly known as the Internet, it is also intended to encompass variations that may be made in the future, including changes and additions to existing standard protocols.

Hypertext Markup Language (HTML). A standard coding convention and set of codes for attaching presentation and linking attributes to informational content within documents. During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). For more information on HTML, see Ian S. Graham, The HTML Source Book, John Wiley and Sons, Inc., 1995 (ISBN 0471-11894-4).

Hypertext Transport Protocol (HTTP). The standard World Wide Web client-server protocol used for the exchange of information (such as HTML documents, and client requests for such documents) between a Web browser and a Web server. HTTP includes a number of different types of messages that can be sent from the client to the server to request different types of server actions. For example, a "GET" message, which has the format GET, causes the server to return the document or file located at the specified Universal Resource Locator (URL).

IP Address. Networks using the TCP/IP protocol route messages from one system to the next, based on the IP address of the destination. The format of an IP address is a 32-bit numeric address written as four numbers separated by periods. Each number can be zero to 255. For example, 204.81.21.151 is the IP address of PATENTDOC.COM.

.SWF. The suffix identifying a Flash file. The .swf format is the final compiled form produced by a system or tool capable of generating Macromedia Flash files. The .swf files may be created from scratch and edited as .fls, or from template files identified as .swt files, neither of which is intended for open distribution, as they are not compiled.

Transmission Control Protocol/Internet Protocol (TCP/IP). A standard Internet protocol (or set of protocols) that specifies how two computers exchange data over the Internet. TCP/IP handles issues such as packetization, packet addressing, and handshaking and error correction. For more information on TCP/IP, see Volumes I, II and III of Comer and Stevens, Internetworking with TCP/IP, Prentice Hall, Inc., ISBNs 0-13-468505-9 (vol. 1), 0-13-125527-4 (vol. II), and 0-13-474222-2 (vol. III).

Uniform Resource Locator (URL). A unique address which fully specifies the location of a file or other resource on the Internet. The general format of a URL is protocol://machine address:port/path/filename. The port specification is optional, and if not entered by the user, the Web browser defaults to the standard port for whatever service is specified as the protocol. For example, if HTTP is specified as the protocol, the Web browser will use the HTTP default port. The machine address in this example is the domain name for the computer or device on which the file is located.

World Wide Web ("Web"). Used herein to refer generally to both (1) a distributed collection of interlinked, user-viewable hypertext documents (commonly referred to as "Web documents", "Web pages", "electronic pages" or "home pages") that are accessible via the Internet, and (2) the client and server software components that provide user access to such documents using standardized Internet protocols. Currently, the primary standard protocol for allowing applications to locate and acquire Web documents is the Hypertext Transfer Protocol (HTTP), and the electronic pages are encoded using the Hypertext Markup Language (HTML). However, the terms "World Wide Web" and "Web" are intended to encompass future markup languages and transport protocols that may be used in place of, or in addition to, the Hypertext Markup Language (HTML) and the Hypertext Transfer Protocol (HTTP).

DETAILED DESCRIPTION OF A PREFERRED EMBODIMENT

A computer network is most simply described as a system in which various computers are interconnected with one another for the sharing of information. When a user connects his or her system to another system, the system they are connecting to is commonly referred to as the host. In many instances, a host is thought of as being a server (the system serving information upon request), however, in actuality, the physical system is the host, and the computer program that provides the information loaded on the host is the server. Systems that connect to these hosts and their associated servers to receive information, such as the Web Site, are typically called clients or user systems.

Figure 1:
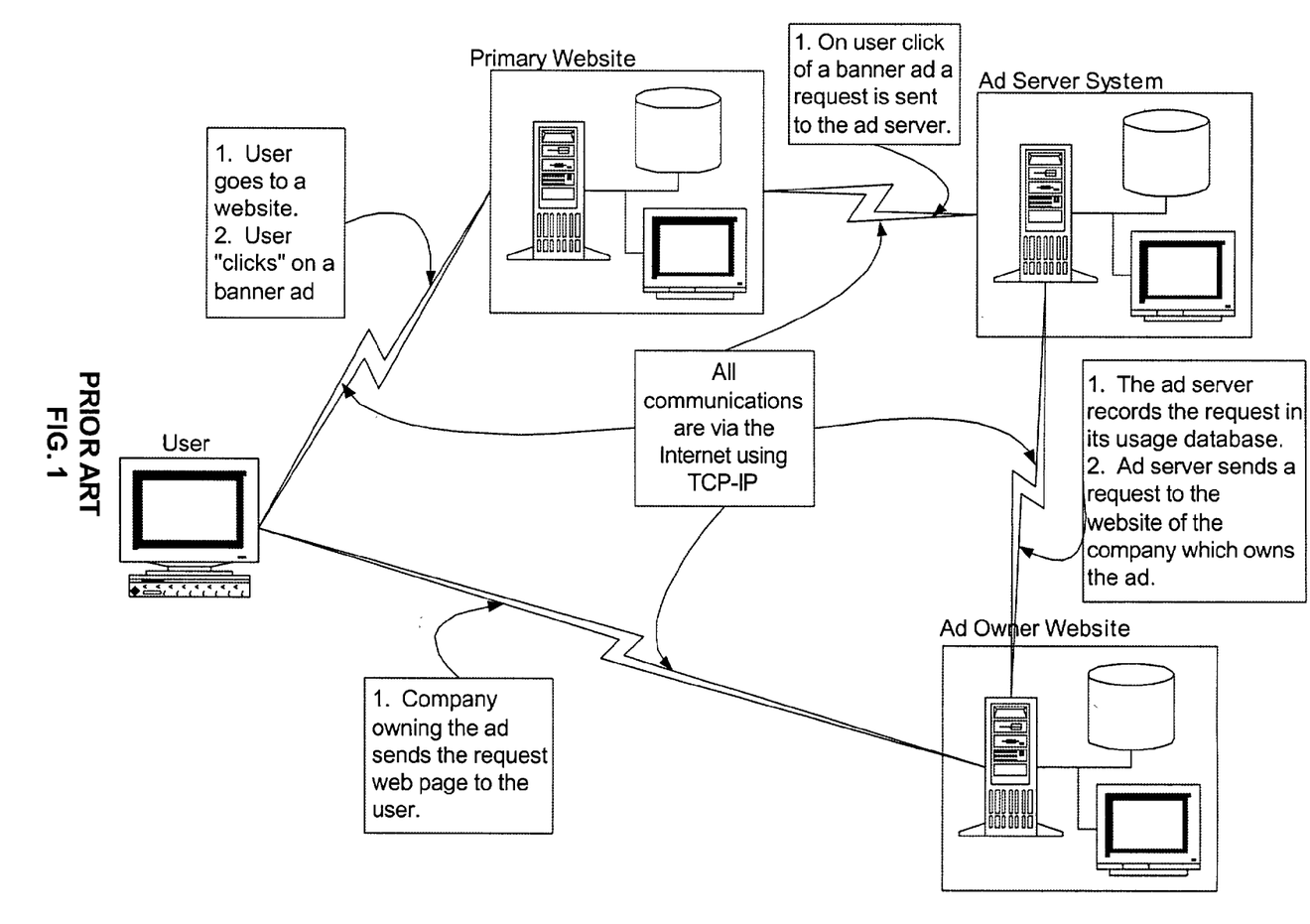
FIG. 1 is an illustration of prior methods of tracking advertising views by users using re-direction.

FIG. 1 illustrates the prior art methodologies involved for a user to access a website he or she sees in an advertisement on a website. As shown, first, the user must connect to a website, and then select the ad of interest. The associated URL for the ad is then activated, and the Ad Server Website is contacted. The Ad Server receives the incoming request for the address location of the site advertised, records the request typically as tabulation for that particular ad, and re-directs the user to the actual host system providing the desired website. Upon connection to this host, the requested information is sent directly back to the User's system, and further interaction between the User and the Ad Owner Website is direct, without further involving the Ad Server Website. If there is heavy traffic in the network connections leading to the Ad Server, or heavy traffic upon the Ad Server, the ability to reach the desired Ad Owner Website may be impaired.

Figure 2:
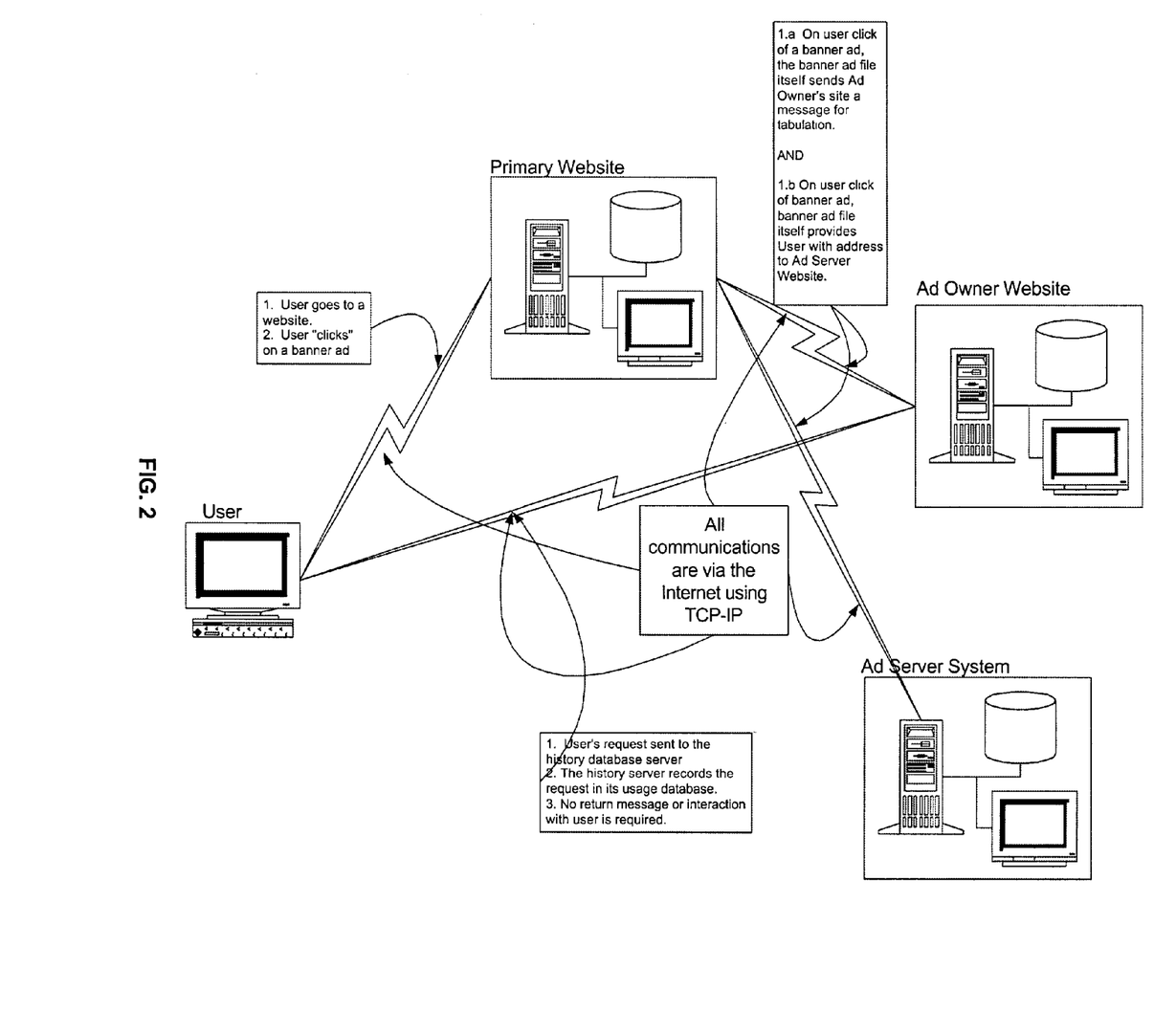
FIG. 2 is an illustration of the method of the present invention for tracking advertising views by users using one-way communication.

FIG. 2 depicts a high-level rendering of the present invention. As shown, unlike the prior art methodology of routing from the Primary Website to the Ad Owner and then on to the Ad Server, under the present invention, preferably the Ad file itself initiates two substantially simultaneous communication links—one to the Ad Owner so that they may tabulate responses to their Ad, and a second communication to the Ad Server site. By providing the desired Ad Server's address directly to the User without the requiring redirection from the Ad Owner, the User, for example, is not impeded by network difficulties or traffic load at the Ad Owner's location.

The method of the present invention is based on the idea that some specific objectives on the Internet do not require a conversation between a user's computer and a server but can be achieved and even works better if the communication is one way from the user's computer to the server.

The method of the present invention accomplishes tracking, secured transactions and server side data sharing.

1) Tracking

Existing tracking methods, (by double click, for example) are based on the idea of re-directing the user's request. With this method when the user clicks on an ad file with an imbedded URL the request first goes to a specific URL which contains a special script or application which calculates these requests and then after executing this sends the user to the requested destination. This method slows down the user's experience and Internet performance because the user is connected to the tracking server first, then from the tracking server to the destination server, and the performance of the tracking server becomes an issue. In the method of the present invention these actions are split and independent from each other. When the user clicks or requests a URL from a system file, the user is sent directly to the requested URL while a query string is independently sent to the tracking server. The performance of the tracking server cannot affect the user's experience, and reliability is increased because the execution of these two actions is not dependent on each other. This query string, or its result, can contain or generate all the necessary information for statistical calculation, including time of action, IP address of the user and does not require any communication back from the server to the user, which can compromise the user's privacy.

2) Secured Transactions

Existing secured transaction methods (by Verisign, for example) is based on the communication between a web server and an Internet browser on the user's side. With a special file/key generated by Verisign the secured data is encrypted on the user side and instantly unencrypted on the server side. This method inevitably slows down the performance of the transaction and at the same time cannot guarantee the total security of the user's information. The process and all its elements are occurring in the public Internet environment. The method of the present invention produces complete security for two reasons: 1) unencryption does not occur during the transaction and 2) communication does not open the user's computer to the Internet. With Macromedia Flash a specific template is created and exported to the .swf format.

This .swf file generates a specific custom formula for the encryption and unencryption of the data. Using Macromedia Flash two separate .swf files are generated in a specific location of a server. The first file will be saved in a folder open to the public, which will contain only the part of the formula, which will encrypt the data. The second file, the key file, will contain the formula which is required to unencrypt the data will be saved in a location closed to the public or on a disc on a local computer. Also, this method allows generation of a formula for unencryption and a specific pin, which will be known only by the administrator. So even if the key file is stolen the formula cannot be activated with out entering the pin. This method allows creating an unlimited amount of bits and formulas in the encryption process as well as an unlimited amount of additional secured ideas of pins and password. For example you could set up a system three different pins known by three different administrators and all three would be necessary to unencrypt the data.

Once the file with the form is filled by the user, the method of the present invention offers the ability to encrypt the data in the user's computer without a browser, or even without an application, even from within an email body. The file grabs a string from the text field of the form, encrypts it using the specific formula made earlier and puts all the data into a one line query string. This query string will be sent to a custom server side application which can be written in any language (visual basic, c++, java, PHP, cgi) and saved on the server in its encrypted format. Unlike convention methods which immediately decrypt data and save that decrypted data on the server, the data saved on the server remains encrypted and is useless to anyone who steals it. In order to decrypt the data, the encrypted file has to be opened with the previously generated key. For credit card processing, for example, this key can be stored in the processing bank, or on a local computer so the data unencrypts only after the administrator accesses it.

3) Server side data sharing

With conventional methods data sharing on the Internet involves a two-way communication between one or multiple users and a server. As described earlier, this two-way communication opens the user's computer to the public and slows down the performance of the data sharing. With the method of the present invention, a user sends his data one way to the server. The data is then generated in an .swf file and sent to a server for storage, or processing. The data can then be grabbed by another user from the Internet, adjusted, then sent back to the server to be generated and grabbed again. This method of data transfer is safer and faster, and works well with any application where data sharing is necessary, such as distance learning, games, banking etc.

Figure 3:
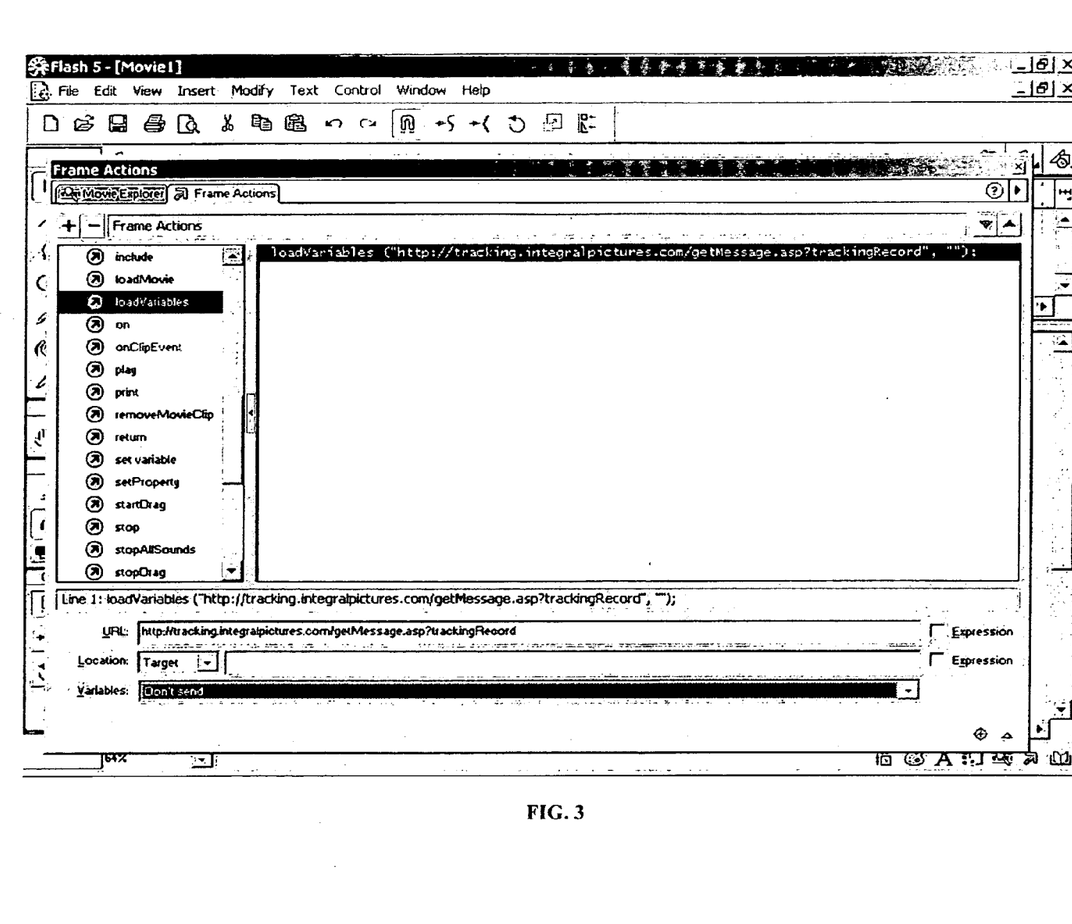
FIG. 3 is an example screen showing how a query string can be sent to a server as a one-way message.

FIG. 3 shows an example of how the communication to the Ad Server is preferably handled such that they may tabulate the response to the ad. The URL of the example Ad Server is <http://tracking.intergralpictures-.com.getMessages.asp>. Information is appended to this URL following a "?" (Question Mark), in this case, "?trackingRecord", which the Ad Server will parse from the URL, and via its own programming, interpret as a command to tabulate a response to the selected Ad. This same method of appending information to the URL permits the system of the present invention to accomplish a variety of complex and simple tasks, as will be further described below, and as may be understood and appreciated by those skilled in the art of computer control and system design.

Figure 4:
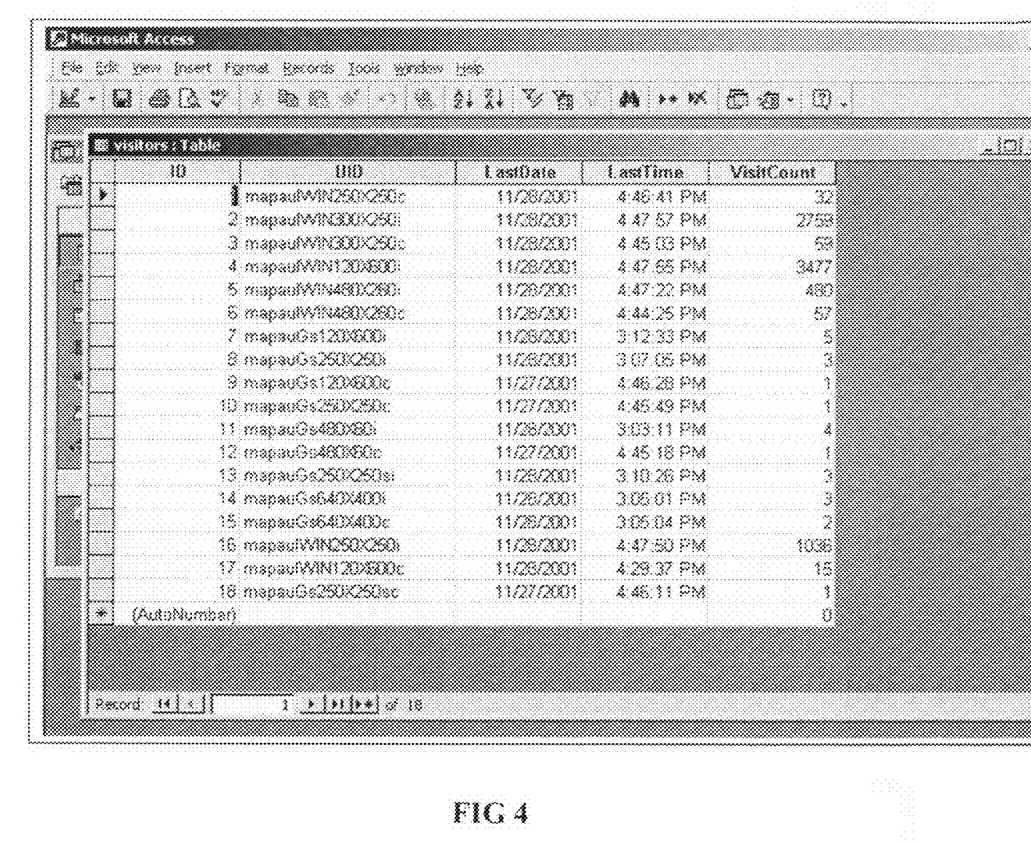
FIG. 4 is an example screen showing the entries in a database table generated.

Below is an example of the type of code that preferably would exist on the server, and which would process the received string of information attached to the URL. The sample code below (which is in our case is getMessage.asp file), grabs the query string received and stores it in the database for tracking purposes (see result sample—FIG. 4):

```
<%@ LANGUAGE="VBSCRIPT" %>
<%
'UID = Request.QueryString("Id")
UID = Request.QueryString
if UID = "" then UID = "Anonymous"
if len(UID) > 100 then UID = "TooLongUID"
for i = 1 to len(UID)
p = right(left(UID, i),1)
if p = Chr(34) or p = Chr(39) then tmp = tmp & p
end if
next
'replace UID, chr(34), ""
'replace UID, chr(39), ""
UID = tmp
Set cn = Server.CreateObject("ADODB.Connection")
cn.Open "FILEDSN=userData.dsn"
Set rsCount = Server.CreateObject("ADODB.Recordset")
Set rsVisitors = Server.CreateObject("ADODB.Recordset")
rsVisitors.Open "SELECT * FROM visitors WHERE UID='" & UID & "'", cn
if rsVisitors.EOF then
cn.Execute("INSERT INTO visitors (UID, LastDate, LastTime, VisitCount)
VALUES ('" & UID & "','" & date & "', '" & time & "', 1)")
else
rsCount.Open "SELECT VisitCount FROM visitors WHERE UID='" & UID & "'",
cn
cnt = rsCount.Fields.Item("VisitCount")
cn.Execute("UPDATE visitors SET VisitCount = 1+" & cnt & ", LastDate = '" & date
& "', LastTime = '" & time & "' WHERE UID = '" & UID & "'")
end if
%>
```

FIG. 4 depicts an example of the database entries that are generated by the code example above.

Figure 5:
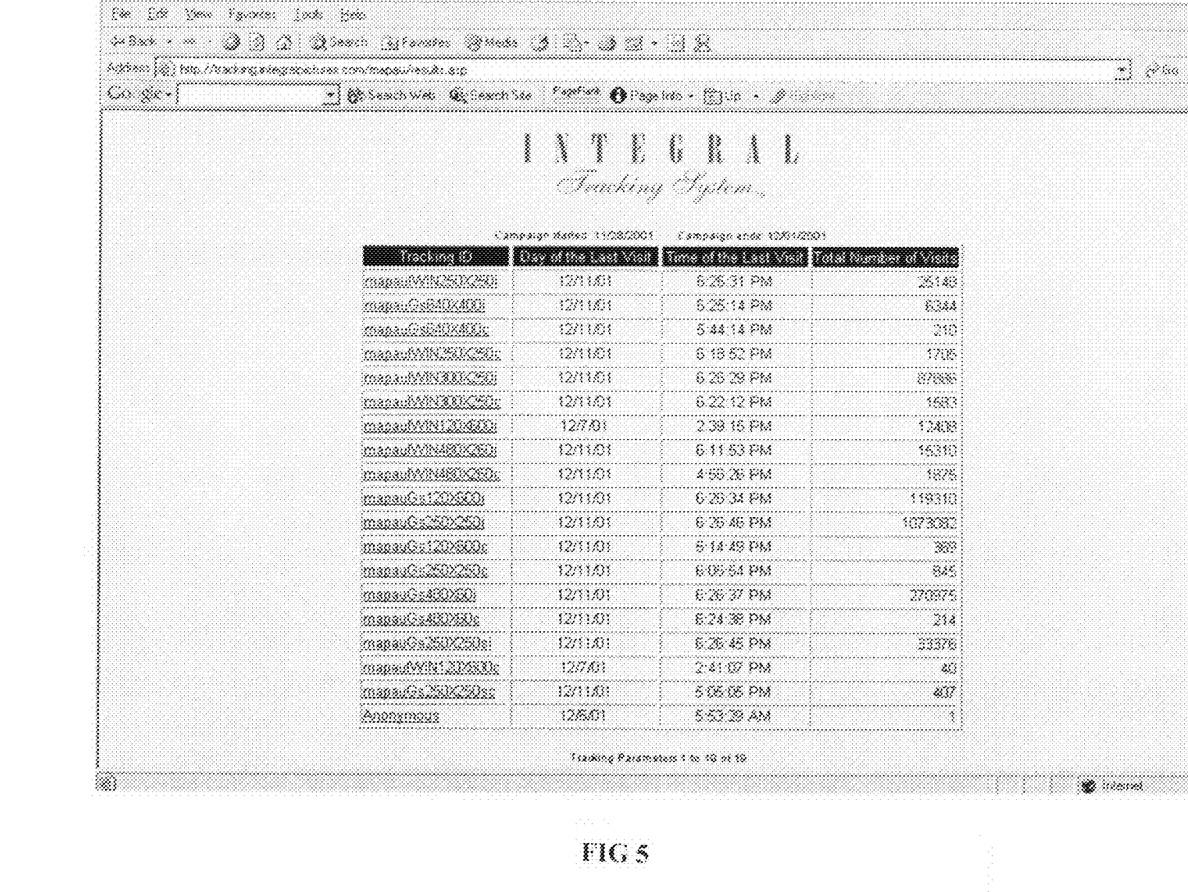
FIG. 5 is an example screen from a website where the tracking results may be displayed to authorized users.

FIG. 5 depicts an example of the graphical interface provided to the system user to report back data collected by a system implemented under the present invention.

Below is an example of code illustrating how the code from above can be modified to store additional data, including, but not limited to, such preferred information as the Users IP address, as well as the date and time of the visit. Also using this method administrator can create custom applications or scripts, which will collect custom data based on his objectives. For instance the following script, in addition to what the previous script does, stores IP address of the computer from which it received the string in the database table "time" and time of each particular request:

```
<% @ LANGUAGE="VBSCRIPT" %>
<%
'UID = Request.QueryString("Id")
UID = Request.QueryString
if UID = "" then UID = "Anonymous"
if len(UID) > 100 then UID = "TooLongUID"
for i = 1 to len(UID)
p = right(left(UID, i),1)
if p = Chr(34) or p = Chr(39) then tmp = tmp & p
end if
next
'replace UID, chr(34), ""
'replace UID, chr(39),
UID = tmp
IP = Request.ServerVariables.Item ("REMOTE_HOST")
Set cn = Server.CreateObject("ADODB.Connection")
cn.Open "FILEDSN=counter.dsn"
Set rsCount = Server.CreateObject("ADODB.Recordset")
Set rsVisitors = Server.CreateObject("ADODB.Reeordset")
rsVisitors.Open "SELECT * FROM visitors WHERE UID='" & UID & "'", cn
if rsVisitors.EOF then
cn.Execute("INSERT INTO visitors (UID, LastDate, LastTime, VisitCount)
VALUES ('" & UID & "','" & date & "', '" & time & "', 1)")
cn.Execute("INSERT INTO timelog (vID, vDate, vTime, vIP) VALUES ('" & UID &
"','" & date & "', '" & time & "', '" & IP & "')")
else
rsCount.Open "SELECT VisitCount FROM visitors WHERE UID='" & UID & "'",
cn
cnt = rsCount.Fields.Item("VisitCount")
cn.Execute("UPDATE visitors SET VisitCount = 1+" & cnt & ", LastDate = '" & date
& "', LastTime = '" & time & "' WHERE UID = '" & UID & "'")
```

```
-continued cn.Execute("INSERT INTO timelog (vID, vDate, vTime, vIP) VALUES ('" & UID &
"', '" & date & time & "', '" & IP & "')")
end if
%>
```

Below is an example of code that might be used to encrypt the contents of a one-way message before it is sent. As shown, such encryption may be as simple as variable and string substitution. It is to be understood that the methodology of encryption is not strictly limited to a type or form as that depicted, rather, under the present invention, users of the system may implement whatever form of encryption technique best suits their purposes. What is specific to the present invention is that the method of encryption is preferably provided to the User as part of the file they access, thus, there is no need for the User to have, acquire, maintain, or otherwise provide an encryption means on his or her own behalf. Further, under appropriate circumstances, the encryption keys used may be modified in each message that is sent to a User, such that security is heightened, and tracking the distribution of the message or ad file further enhanced. This shows a sample action script which can be attached to a frame or button of a Flash file, which takes the characters in the text field and converts each character in a sub-string of a query string to be send to a server:

```
if (pas.charAt(0)==1) {
firstChar = "046728763";
} else if(pas.charAt(0)==2) {
firstChar = "87290987";
} else if (pas.charAt(0)==3) {
firstChar = "34089274";
}
if (pas.charAt(1)==1) {
thirdChar = "ad87f6adf76";
} else if(pas.charAt(1)==2) {
thirdChar = "mwenbr53sd";
} else if(pas.charAt(1)==3) {
thirdChar = "234hgjshd7643";
}
if (pas.charAt(2)==1) {
secondChar = "nbvqwev672";
} else if (pas.charAt(2)==2) {
seeondChar = "823764ggd";
} else if (pas.charAt(2)==3) {
secondChar = "asdh28373ghssdfs3";
}
encryptedString = firstChar+secondChar+thirdChar;
en = encryptedString;
    // so the "load variable" string will look like
    http://website.com/getMessage.asp?en
```

Figure 6:
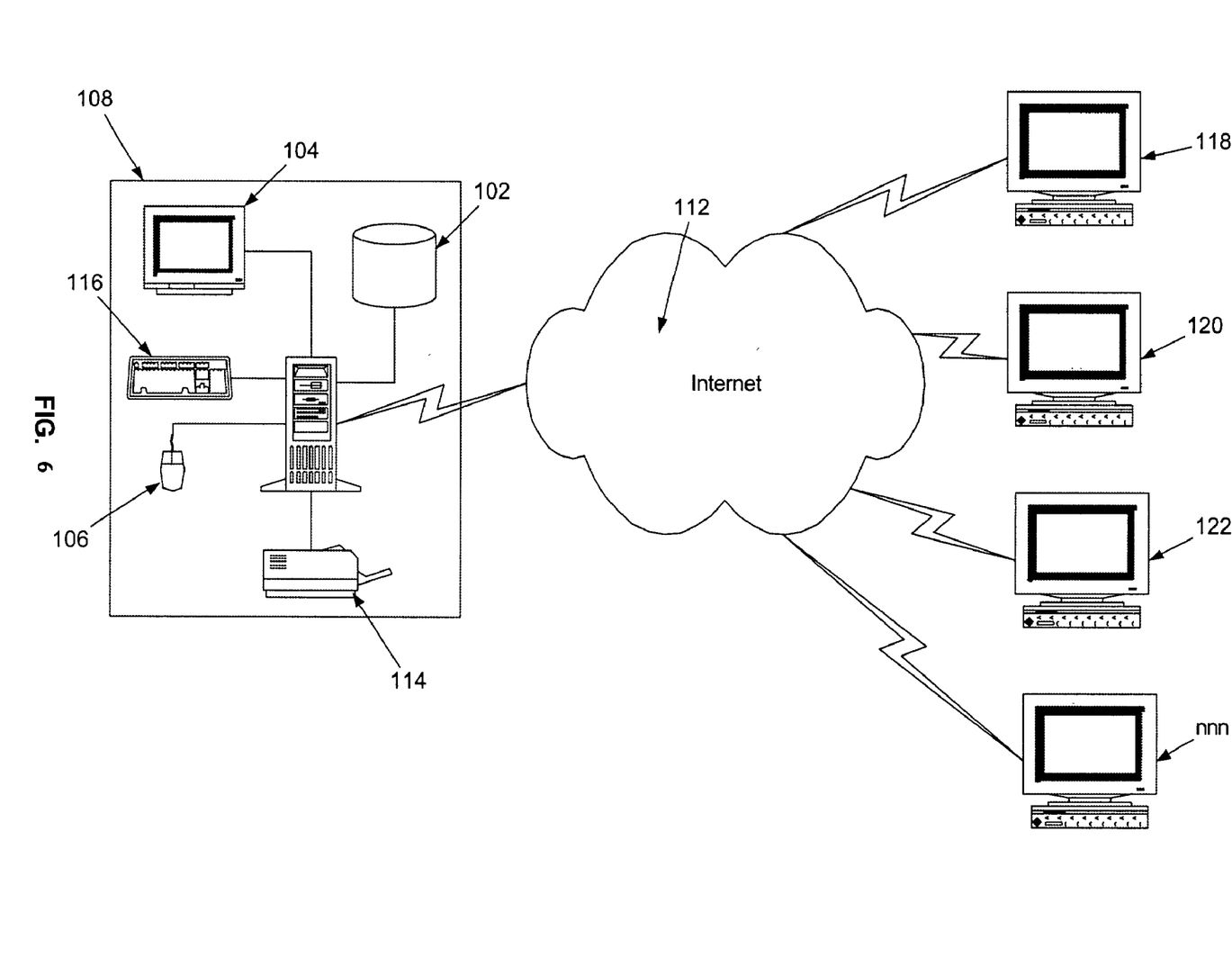
FIG. 6 is diagrammatical overview of the Internet communications used in the system of the present invention.

Referring now to FIG. 6, an overview of a preferred embodiment of the present invention is shown. The present invention preferably comprises a computer system 108. The computer system 108 comprises input and output devices, as is well-known in the art. For example, the computer system 108 preferably comprises a display screen or monitor 104, a keyboard 116, a printer 114, a mouse 106, etc. The computer system 108 further preferably comprises a database 102 for storage of the data, and software comprising preferred embodiments of the present invention. The computer system 108 is preferably connected to the Internet 112 that serves as the presently preferred communications medium. The Internet 112, as previously discussed, comprises a global network of networks and computers, public and private. The Internet 112 is the preferable connection method by the users 118, 120, 122 and nnn in preferred embodiments of the present invention.

Figure 7:
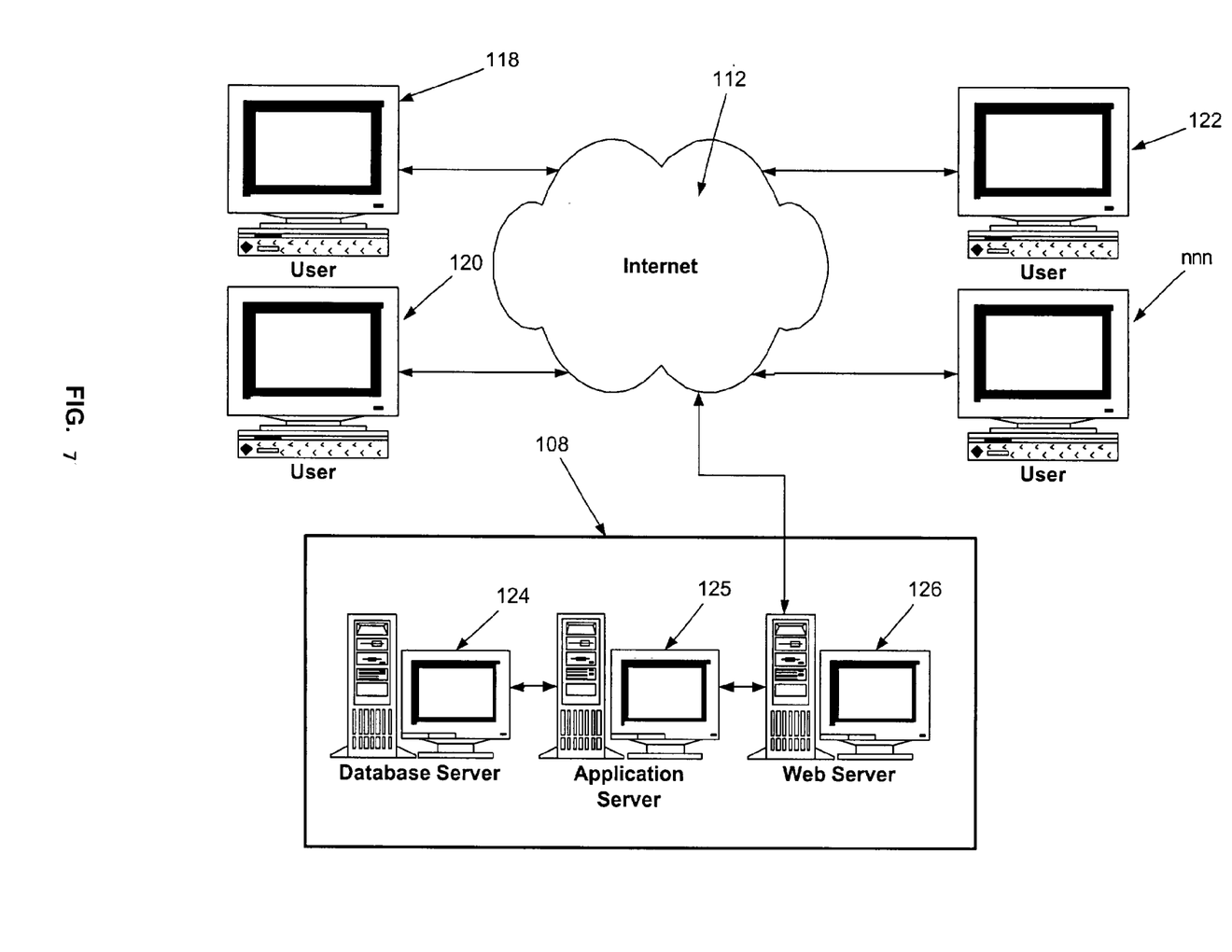
FIG. 7 is a diagrammatical overview of the website computer system.

Referring now to FIG. 7, the computer system 108 is shown in more detail. The computer system 108, in a preferred embodiment, comprises a database server 124, an application server 125, and a web server 126. The database server 124 preferably runs in a variety of operating system environments, including MS Windows NT, MS Windows 2000, MS Windows XP, Linux and others, and preferably utilizes a variety of database management systems, including MS SQL Server, Oracle and others. The application server 125 preferably runs in a variety of operating system environments, including MS Windows NT, MS Windows 2000, MS Windows XP, Linux and others. The web server 126 also preferably runs in a variety of operating system environments, including MS Windows NT, MS Windows 2000, MS Windows XP, Linux and others. Preferably, the web server 126 operates only as the web server.

Figure 8:
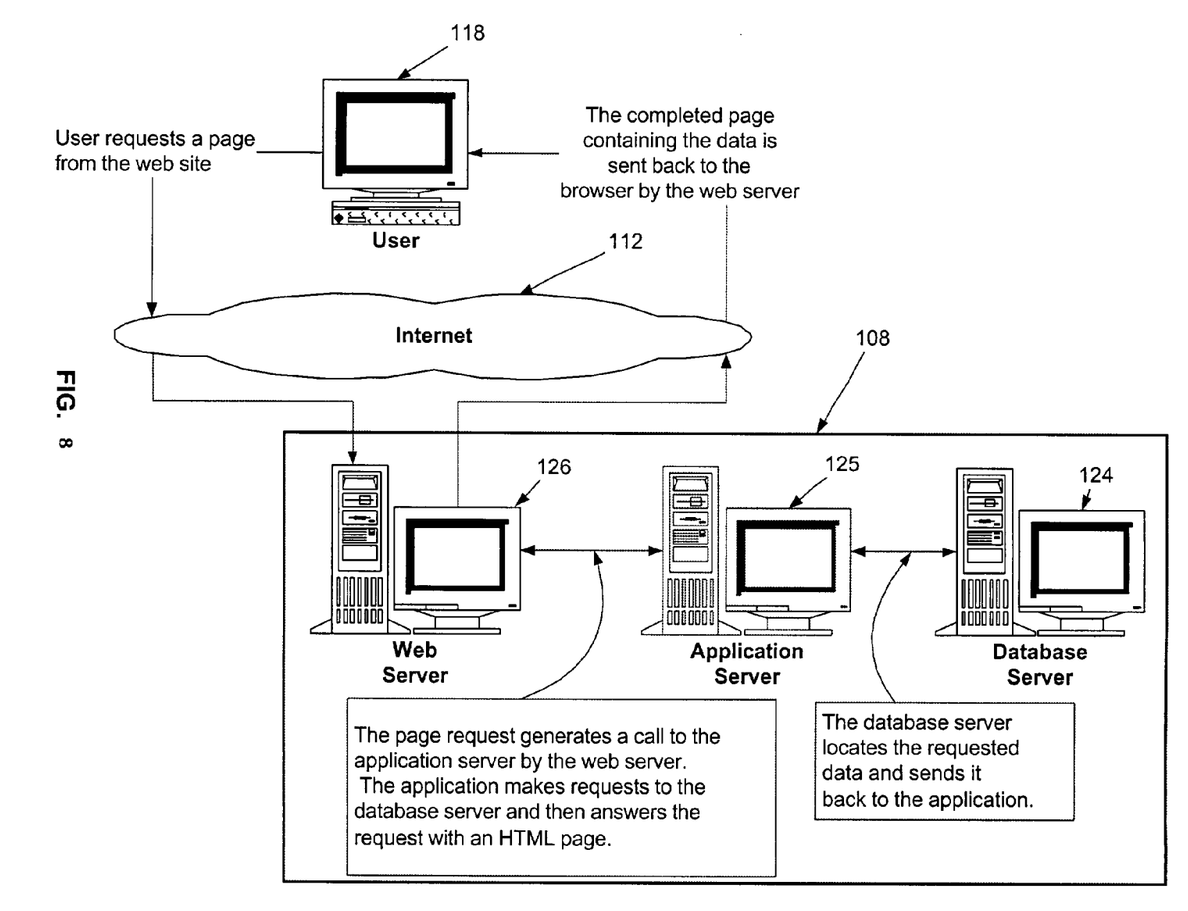
FIG. 8 is a diagrammatical overview of the relationship among the website servers and the users.

Referring to FIG. 8, a simplified functional diagram of a preferred embodiment of the present invention is shown. This Figure shows the preferred relationships between a user 118 (exemplary of any number of users 118, 120, 122, nnn), the Internet 112, the web server 126, the application server 125 and the database server 124. As shown, a user 118 requests a page from the web site of the present invention. The user 118 is preferably connected via the internet 112, and the web page request initiates a call to the present invention. The present invention then makes at least one request to the database server 124 and generates an HTML page for transmission to the user 118 following the database server's completion of the present invention's request and transmission of the requested data back to the web server 126. The web server 126 transmits the completed HTML page containing the data requested by the user 118 through the Internet 112 to the user 118.

In application, the server operating under the present invention preferably generates and delivers to the client by means of email, or as an embedded ad in a web page, a compiled file. Preferably, this compiled file is a Flash file identified by the .swf suffix. The use of the Macromedia Flash file is preferred because of the ability to provide instructional code within the .swf, and because nearly all client computer systems have been enabled with the Flash player as a result of normal Internet browser configuration. It is to be understood that under the teachings of the present invention, any type of file that is capable of operation without the instantiation of an additional application could be used in place of Flash and the .swf file; however, presently, such is the preferred method of operation.

Under the present invention, the user activates the compiled file by such means as they prefer for their chosen computer system, typically placing the mouse cursor over the file or ad, and double clicking the mouse. As enabled by the Flash player, the file launches as a self-contained window. As directed by its internal coding, the .swf establishes a connection, via TCP/IP, with the specified server, and pulls Flash images for presentation to the user.

In the situation depicted in FIG. 2, the coding of the .swf file establishes two substantially simultaneous connections, with one to the indicated server, for the purpose of fetching Flash images for presentation to the user, and the second communication link to the Ad Server, so that a tabulation may be made, appropriately noting the response to the ad. As the communications to both systems are only made once the file has been open, this is preferred over the prior art methodologies, which initiate the communication for tabulation prior to completing the link to the desired site. In many cases, such tabulation is premature, as the User may close the window before the earlier desired material is delivered.

Various components of the Flash window are preferably enabled for user interaction. Such components may be text input boxes, option buttons, or other components. As each image that comprises the animated presentation must be delivered to the client system, the server is provided with a means to track the time and length of the connection.

As shown in FIG. 3, when the client selects an enabled feature of the active Flash screen, the compiled program attaches a specific code element (which may be previously defined, or compiled with user supplied information) to a URL internally known to the file. This information is directed back to the server to be protected. Under appropriate circumstances, the client user material can be encoded.

The standard prior art way to load variables is using "GET" or "POST" method. "GET" is sending it in URL as a part of a string (everything after "?" sign; ex: http://website.com?variable (limited number of characters—little bit more then 8000). "POST" sends variables in the body of a document (unlimited number of characters). Both ways require communication between browser and a server. The present invention uses action "load variables" which are put in a URL string, as used for a "GET" method, but not sending it—"Don't send". It is "One way message" and a server will not be able to answer because it does not know to whom it is talking to. But for purposes of the present invention an answer is not needed—a server will receive a request for a certain document (via a URL ASP file, written, for example, on Visual Basic which grabs the received variable (as a query string—everything after "?" sign) and stores it in a server based database). This process is invisible for user because there is no software or browser objects involved—they can't react on a server response, which is the missing part in this method.

Sample code (which is in the present case is getMessage.asp file), which grabs the query string received and stores it in the database for tracking purposes is provided below:

```
<%@ LANGUAGE="VBSCRIPT" %>
<%
'UID = Request.QueryString("Id")
UID = Request.QueryString
if UID = "" then UID = "Anonymous"
if len(UID) > 100 then UID = "TooLongUID"
for i = 1 to len(UID)
p = right(left(UID, i),1)
if p = Chr(34) or p = Chr(39) then tmp = tmp & p
end if
next
'replace UID, chr(34), ""
'replace UID, chr(39), ""
UID = tmp
Set cn = Server.CreateObject("ADODB.Connection")
cn.Open "FILEDSN=userData.dsn"
Set rsCount = Server.CreateObject("ADODB.Recordset")
Set rsVisitors = Server.CreateObject("ADODB.Recordset")
rsVisitors.Open "SELECT * FROM visitors WHERE UID'" & UID & "'", cn
if rsVisitors.EOF then
cn.Execute("INSERT INTO visitors (UID, LastDate, LastTime, VisitCount) VALUES ('" & UID
& "', '" & date & "', '"
& time & "', 1)")
else
rsCount.Open "SELECT VisitCount FROM visitors WHERE UID='" & UID & "'", cn
cnt = rsCount.Fields.Item("VisitCount")
cn.Execute("UPDATE visitors SET VisitCount = 1+" & cnt & ", LastDate = '" & date & "',
LastTime = '" & time & "'
WHERE UID = '" & UID & "'")
end if
%>.
``` received by the server, and parsed from the end of the URL by means commonly known and understood by those skilled in the art of network and database interaction. Based upon the returned information as parsed, the server may modify or select a different image for delivery to the client system. In other instances, the information returned may preferably simply be written to a database for use or tabulation at a later date.

If desired, the present invention teaches that the file may preferably contain methodology for encryption, thus permitting the information attached to the end of the URL and FIG. 4 depicts the entry in the database, stored on a server and connected using userData.dsn file. In this sample the database (MS Access file) file contains a table named 'visitors'. The only thing this script does is it grabs the query string (which is a simple literal string like 'mapaulWIN250× 250c' and is identifier of a certain tracking file, put it in a new row in the table, if it is not exists yet in the table, adds (or update) day and time of the request and calculate number of requests (adds 1 to existing number). This method does not require any configuration or setup for a new tracking documents or files—any new literal string received will create a new row in the table. Once it's done, using any standard solution administrator can put this table online for visual representation of data in real time—this table can be seen online at http://tracking.integralpictures.com/mapau (user: mapau, password: foster ). A user can go to http://http://www.integralpictures.com/mapau/iwin/250×250 and click on it, refresh the tracking page and will see the changes (day, time and visits count) on the rows 'mapauIWIN250×250i' (the string which identify "impressions" of this ad sent from the file when opened) and 'mapauIWIN250×250c' (the string which identify "click through" which send this string when the user clicks on a 'spin' button). This file is attached to an email—and can be opened without any browser or software and if the user's computer is connected to the Internet the user will see the same result without a browser.

Also using this method a system administrator can create custom applications or scripts, which will collect custom data based on his objectives. For instance the following script, in addition to what the previous script does, stores IP address of the computer from which it received the string in the database table 'time' and time of each particular request:

```
if (pas.charAt(0)==1) {
firstChar = "046728763";
} else if (pas.charAt(0)==2) {
firstChar = "87290987";
} else if (pas.charAt(0)==3) {
firstChar = "34089274";
}
if (pas.charAt(1)==1) {
thirdChar = "ad87f6adf76";
} else if(pas.charAt(1)==2) {
thirdChar = " mwenbr53sd";
} else if(pas.charAt(1)==3) {
thirdChar = "234hgjshd7643";
}
if (pas.charAt(2)==1) {
secondChar = "nbvqwev672";
} else if(pas.charAt(2)==2) {
secondChar = " 823764ggd";
} else if (pas.charAt(2)==3) {
secondChar = "asdh28373ghssdfs3";
}
```

```
<%@ LANGUAGE="VBSCRIPT" %>
<%
'UID = Request.QueryString("Id")
UID = Request.QueryString
if UID = "" then UID = "Anonymous"
if len(UID) > 100 then UID = "TooLongUID"
for i = 1 to len(UID)
p = right(left(UID, i),1)
if p = Chr(34) or p = Chr(39) then tmp = tmp & p
end if
next
'replace UID, chr(34), ""
'replace UID, chr(39), ""
UID = tmp
IP = Request.ServerVariables.Item ("REMOTE_HOST")
Set cn = Server.CreateObject("ADODB.Connection")
cn.Open "FILEDSN=counter.dsn"
Set rsCount = Server.CreateObject("ADODB.Recordset")
Set rsVisitors = Server.CreateObject("ADODB.Recordset")
rsVisitors.Open "SELECT * FROM visitors WHERE UID='" & UID & "'", cn
if rsVisitors.EOF then
cn.Execute("INSERT INTO visitors (UID, LastDate, LastTime, VisitCount) VALUES ('" & UID
& "', '" & date & "', '"
& time & "', 1)")
cn.Execute("INSERT INTO timelog (vID, vDate, vTime, vIP) VALUES ('" & UID & "', '" &
date & "', '" & time & "',
'" & IP & "')")
else.6
rsCount.Open "SELECT VisitCount FROM visitors WHERE UID='" & UID & "'", cn
cnt rsCount.Fields.Item("VisitCount")
cn.Execute("UPDATE visitors SET VisitCount = 1+" & cnt & ", LastDate = '" & date & "',
LastTime = '" & time & "'
WHERE UID = '" & UID & "'")
cn.Execute("INSERT INTO timelog (vID, vDate, vTime, vIP) VALUES ('" & UID & "', '" &
date & "', '" & time & "',
'" & IP & "')")
end if
%>.
```

The secured transition works the same way. The difference is instead "literal string", which is identifier in the tracking process, it is an encrypted message which holds the actual information.

Below is a sample action script which can be attached to a frame or button of a Flash file, which takes the characters in the text field and convert each character in a substring of a query string to be send to a server:

-continued

```
encryptedString = firstC har+secondChar+thirdChar;
en = encryptedString;
```

The "load variable" string will look like http://website.com/getMessage.asp?en

For instance if a user enters "123" in a text field "pas", the URL string will look like: http://website.com/getMessage.asp?046728763asdh28373ghssdfs3 mwenbr53sd where 046728763asdh28373ghssdfs3 mwenbr53sd is 123, but 046728763asdh28373ghssdfs3 mwenbr53sd will be stored in a new row of the database. In order to see the actual data a key file is used which contains a script (the same formula backwards or any other custom formula) which knows the logic and can understand what this line means. The script can be as simple as the following:

```
if (pin=="1234") {
if (en.charAt(8)==3) {
firstUn = "1";
} else if(en.charAt(7)==7) {
firstUn = "2";
} else if(en.charAt(7)==4) {
firstUn ="3";
}
if (en.charAt(19)==6 || en.charAt(18)==6) {
secondUn = "1";
} else if(en.charAt(19)=="d" || en.charAt(18)=="d") {
secondUn="2";
}
if (en.charAt(12)=="h" || en.charAt(11)=="h") {
secondUn ="3";
}
}
}
// and so on . . .
unencryptedString = firstUn+secondUn;
un = unencryptedString;
```

As can be seen in even this simple sample the administrator has to know a pin "1234" in order to activate the script and unlimited amount of "unknown" parameters could be involved in an encryption process/formulas (like length of each substring and a formula behind it can be different, and also each particular transaction may contain a different key or part of a key/formula). Also the encrypted message can be created in a "literal string" format or binary format or a combination of both, which does the encryption much more sophisticated and practically impossible to unencrypted without key file.

The data sharing process is also based on the same idea—data can be stored on the server directly from the file. As a sample let's take a game—"chess". Both players know the URL to the file which is stored on a server and can show them the result of the database entries. Each player has his own identifier name (which is a query string as discussed above "player1","player2" like "mapauIWIN250×250". . . ). The sample message (a player's step) may look like:

http://website.com/getMessage.asp?player1+E2E4

For instance, if an email is created in the HTML format any click on a link will instantly open the browser first and show the requested document inside the opened browser. In addition, if a form in the HTML code of the email body is created and an attempt is made to directly connect to a URL with a server side script a window will pop up, which says "This action will be not a secured action and all information stored in email software including email addresses can be read from the server." To make any connection the server has to see, connect or communicate with the application on the remote computer. Only an Internet browser supports the privacy of a communication, so to attempt this connection from the email body opens the remote computer to the public.

Encryption may be achieved by means of the present invention as follows:

A message can be encrypted using randomly generated numbers (attached is .swf file which illustrates how this script works—it can be saved on a hard drive and then opened in the browser.) Every click (transaction) this script randomly generate a key number first, which it uses in algorithm to encrypt up to 16 digits credit card number. In this sample this algorithm is just simple formula "myNewDigit=digit*rendomKeyNumber", but it can be practically universal if it will contains a pin number, known only by a user: ex. "myNewDigit=(digit*rendomKeyNumber)−myPinNumber". The randomly generated key itself is a part of a new string to be send to a server, but it does not help anybody if he does not know the algorithm we used to hide it inside the message string. Also he has to know a 'pin' (or 'pins' because this algorithm may contain multiple pins used in the formulas), the length of a key number substring, the length of each substring of a new number in a formula results, and in which order we placed the new, created by algorithm, numbers.

The script on a user side:

k=random(1000000); // in LOTTERY people dialing with 51 random numbers!
pin=myNumber // any numb er known by user (ex. "2" or "5783" . . . )
ks=k.toString();
kl=ks.length;
n1=card.charAt(0)*k;
n2=card.charAt(1)*k;
n3=card.charAt(2)*k;
n4=card.charAt(3)*k;
n5=card.charAt(4)*k;
n6=card.charAt(5)*k;
n7=card.charAt(6)*k;
n8=card.charAt(7)*k;
n9=card.charAt(8)*k;
n10=card.charAt(9)*k;
n11=card.charAt(10)*k;
n12=card.charAt(11)*k;
n13=card.charAt(12)*k;
n14=card.charAt(13)*k;
n15=card.charAt(14)*k;
n16=card.charAt(15)*k;
n1s=n1.toString();
n2s=n2.toString();
n3s=n3.toString();
n4s=n4.toString();
n5s=n5.toString();
n6s=n6.toString();
n7s=n7.toString();
n8s=n8.toString();
n9s=n9.toString();
n10s=n10.toString();
n11s=n11.toString();
n12s=n12.toString();
n13s=n13.toString();
n14s=n14.toString();
n15s=n15.toString();
n16s=n16.toString();
n11=n1s.length;
n21=n2s.length;
n31=n3s.length;
n41=n4s.length;.n51=n5s.length;
n61=n6s.length;
n71=n7s.length;
n81=n8s.length;
n91=n9s.length;
n101=n10s.length;

```
n111=n11s.length;
n121=n12s.length;
n131=n13s.length;
n141=n14s.length;
n151=n15s.length;
n161=n16s.length; message=(k1−pin)+""+k+""+(n11−pin)+
    ""+
n21+""+n31+""+n41+""+n51+""+n61+""+n71+""+n81+""+
    n91+""+n101+""+n111+""+(n121+pin)+""+n131+""+
    n141+""+n151+""+n161+""+n1+""+n2+
9+""+n10+""+n11+""+n12+""+(n13−pin*3)+""+n14+""+
    n15+""+n16+""+k*pin;
```

The script to read the encrypted message:
```
dk=Number(message.charAt(0))+pin;
key=Number(message.substring(1, dk+1));
ds1=Number(message.charAt(dk+1))+pin;
ds2=Number(message.charAt(dk+2));
ds3=Number(message.charAt(dk+3));
ds4=Number(message.charAt(dk+4));
ds5=Number(message.charAt(dk+5));
ds6=Number(message.charAt(dk+6));
ds7=Number(message.charAt(dk+7));
ds8=Number(message.charAt(dk+8));
ds9=Number(message.charAt(dk+9));
ds10=Number(message.charAt(dk+10));
ds11=Number(message.charAt(dk+11));
ds12=Number(message.charAt(dk+12))−pin;
ds13=Number(message.charAt(dk+13));
ds14=Number(message.charAt(dk+14));
ds15=Number(message.charAt(dk+15));
ds16=Number(message.charAt(dk+16));
nu1=Number(message.substring(dk+17, dk+17+ds1))/key;
nu2=Number(message.substring(dk+17+ds1, dk+17+ds1+
    ds2))/key;  nu3=Number(message.substring(dk+17+ds1+
    ds2, dk+17+ds1+ds2+ds3))/key
nu4=Number(message.substring(dk+17+ds1+ds2+ds3,
    dk+17+ds1+ds2+ds
dkt=dk+17+ds1+ds2+ds3+ds4;
nu5=Number(message.substring(dkt,  dkt+ds5))/key;
    nu6=Number(message.substring(dkt+ds5,  dkt+ds5+
    ds6))/key; nu7=Number(message.substring(dkt+ds5+ds6,
    dkt+ds5+ds6+ds7))/key; nu8=Number(message.substring
    (dkt+ds5+ds6+ds7, dkt+ds5+ds6+ds7+ds8))
nu9=Number(message.substring(dkt+ds5+ds6+ds7+ds8,
    dkt+ds5+ds6+ds7'
dktt=dkt+ds5+ds6+ds7+ds8+ds9;
nu10=Number(message.substring(dktt, dktt+ds10))/key;
nu11=Number(message.substring(dktt+ds10,  dktt+ds10+
    ds11))/key;     nu12=Number(message.substring(dktt+
    ds10+ds11, dktt+ds10+ds11+ds12))/key;
nu13=(Number(message.substring(dktt+ds10+ds11+ds12,
    dktt+ds10+ds11+ds12+ds13))+pin)/key;
nu14=Number(message.substring(dktt+ds10+ds11+ds12+
    ds13,          dktt+ds10+ds11+ds12+ds13+ds14))/key;
nu15=Number(message.substring(dktt+ds10+ds11+
    ds12+ds13+ds14, dktt+ds10+ds11+ds
4+ds15))/key;
nu16=Number(message.substring(dktt+ds10+ds11+ds12+
    ds13+ds14+ds15,   dktt+ds10+ds11+ds12+ds13+ds14+
    ds15+ds16))/key;
cardBack=
nu1+""+nu2+""+nu3+""+nu4+""+nu5+""+nu6+""+nu7+""+
    nu8+""+nu9+""+nu10+""+nu11+""+nu12+""+nu13+""+
    nu14+""+nu15+""+nu16;
```

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A method for direct network communication between a file and a server comprising the following steps:
    selecting a data file that is stored on a computer, said computer communicating with a network;
    creating on said computer a self-contained compiled file comprising a data string representing the contents of said data file and a URL indicator attached thereto representing a custom software application that is stored on a server, said self-contained compiled file causing said custom software application stored on said server to take specified preprogrammed action after receiving a one-way non-conversational message from said self-contained compiled file;
    encrypting said data string to form one or more encrypted data strings for use as said one-way non-conversational message to said custom software application at said server;
    sending said data string and said URL indicator from said self-contained compiled file as a one-way non-conversational message to said custom software application stored on said server via said network without having to use an Internet browser application and without having to open said computer to said network for two-way communication; and
    receiving said one-way non-conversational message at said server, logging receipt of said message and causing said specified preprogrammed action to be taken without communication back from said server to said computer.

2. The method of claim 1, wherein said self-contained compiled file is a .swf file.

3. The method of claim 1, further comprising the step of sending said data string and said URL indicator from said server to a second computer communicating with said network.

4. The method of claim 1, wherein said network communications utilize Internet protocols.

5. A method for file server direct communication comprising the steps of:
    selecting a data file residing on a computer that communicates with a network that utilizes Internet protocol for communications;
    creating on said computer a self-contained compiled file comprising a data string representing the contents of said data file;
    attaching to said data string a URL indicator corresponding to a custom software application stored on a server, said self-contained compiled file causing said custom software application stored on said server to take specified preprogrammed action after receiving a one-way non-conversational message from said self-contained compiled file;
    encrypting said data string to form one or more encrypted data strings for use as said one-way non-conversational message to said custom software application at said server;
    sending from said computer said data string and said URL indicator via said network to said custom software application stored on said server as a one-way non-conversational message, without opening said computer to said network for two-way communication and without requiring use of a browser application; and receiving said one-way non-conversational message at said server, causing said specified preprogrammed action to be taken without any communication back from said server to said computer.

6. The method of claim 5, further comprising the step of logging receipt of said one-way non-conversational message after receipt at said server.

7. The method of claim 5, further comprising the step of providing for said custom software application at said server, after receiving said one-way non-conversational message, to make said data string and said URL indicator available to a second computer communicating with said network.

8. A system for file server direct communication comprising:

one or more data files;

a computer storing said one or more data files, said computer communicating with a network;

a server communicating with said network;

a custom software application stored on said server;

interface means for selecting a file from said one or more data files stored on said computer;

processor means for creating a self-contained compiled file comprising a data string corresponding to the contents of said selected file and attaching to said data string a URL indicator representing said custom software application stored on said server, wherein said self-contained compiled file causes said custom software application stored on said server to take specified preprogrammed action after receiving a one-way non-conversational message from said self-contained compiled file;

means for encrypting said data string to form one or more encrypted data strings for use as said one-way non-conversational message to said custom software application at said server; and computer communication means for sending from said computer said first data string and said URL indicator as a one-way non-conversational message to said custom software application at said server via said network without a message from said server back to said computer, without opening said computer to said network for two-way communication and without requiring use of an Internet browser application.

9. The system of claim 8, wherein said one-way non-conversational message serves, at least in part, a purpose of tracking at least one action of said computer.

10. The system of claim 8, further comprising means for said data string and URL indicator to be sent from said server to a second computer communicating with said network after said one-way non-conversational message is received by said custom software application at said server.

* * * * *